(12) United States Patent
Dundas et al.

(10) Patent No.: US 7,284,958 B2
(45) Date of Patent: Oct. 23, 2007

(54) SEPARABLE BLADE PLATFORM

(75) Inventors: Jason E. Dundas, Post Falls, ID (US); Ted J. Freeman, Avon, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 10/799,223

(22) Filed: Mar. 12, 2004

(65) Prior Publication Data

US 2007/0189901 A1 Aug. 16, 2007

Related U.S. Application Data

(60) Provisional application No. 60/456,892, filed on Mar. 22, 2003.

(51) Int. Cl.
  *F01D 5/30* (2006.01)
(52) U.S. Cl. ............................ 416/193 A; 416/220 R
(58) Field of Classification Search ............ 416/193 A, 416/219 R, 220 R, 196 R, 191
See application file for complete search history.

(56) References Cited

U.S. PATENT DOCUMENTS

| | | | |
|---|---|---|---|
| 3,008,689 A * | 11/1961 | Cook et al. ................. | 416/221 |
| 3,494,709 A * | 2/1970 | Piearcey ..................... | 416/232 |
| 3,644,058 A | 2/1972 | Barnabei et al. | |
| 3,761,200 A | 9/1973 | Gardiner | |
| 3,801,222 A * | 4/1974 | Violette ................... | 416/220 R |
| 4,019,832 A | 4/1977 | Salemme et al. | |
| 4,098,559 A | 7/1978 | Price | |
| 4,279,572 A | 7/1981 | Auriemma | |
| 4,501,053 A * | 2/1985 | Craig et al. ............ | 29/889.721 |
| 4,798,520 A | 1/1989 | Partington et al. | |
| 4,802,824 A * | 2/1989 | Gastebois et al. ...... | 416/193 A |
| 5,007,800 A | 4/1991 | Hacault et al. | |
| 5,018,941 A | 5/1991 | Heurtel et al. | |
| 5,222,865 A * | 6/1993 | Corsmeier .............. | 416/193 A |
| 5,277,548 A | 1/1994 | Klein et al. | |
| 5,421,704 A | 6/1995 | Carletti et al. | |
| 5,443,365 A | 8/1995 | Ingling et al. | |
| 5,820,346 A | 10/1998 | Young et al. | |
| 5,993,160 A | 11/1999 | Bouchard et al. | |
| 6,217,283 B1 * | 4/2001 | Ravenhall et al. ............. | 416/2 |
| 6,302,648 B1 | 10/2001 | Konishi et al. | |
| 6,457,942 B1 | 10/2002 | Forrester | |
| 6,726,452 B2 * | 4/2004 | Strassberger et al. ....... | 416/190 |

* cited by examiner

*Primary Examiner*—Edward K. Look
*Assistant Examiner*—Nathan Wiehe
(74) *Attorney, Agent, or Firm*—Krieg DeVault LLP

(57) ABSTRACT

A gas turbine engine blade platform including a par of platform retention members. The pair of platform retention members are configured to be located on opposite sides of a disk lug. The retention members interact with the disk lug to restrain radial movement of the platform during rotation of a disk.

15 Claims, 5 Drawing Sheets

SEPARABLE BLADE PLATFORM

REFERENCE TO RELATED APPLICATIONS

The present application claims the benefit of U.S. Provisional Application No. 60/456,892, filed Mar. 22, 2003, which is incorporated herein by reference.

The present invention was made under Government Contract No. F33615-98-C-2912, and the United States Government may have certain rights therein.

BACKGROUND OF THE INVENTION

The present invention relates generally to gas turbine engines, and more particularly to gas turbine engine bladed rotors having separable blade platforms that are coupled to the rotor disk/wheel by mechanical engagement with the rotor disk lugs. Although the present invention was developed for gas turbine engines, certain applications may be outside of this field.

Gas turbine engine rotors typically employ blade platforms that extend generally laterally of the blades to partially define an aerodynamic flow path between adjacent blades. One conventional approach utilized to retain the blades to the rotor disk/wheel has been by the utilization of dovetail and slot arrangements. Associated with this conventional approach of retaining the blades to the rotor disk/wheel has been the utilization of blades with integrally formed platforms.

The continued demand on gas turbine engine technology has resulted in some prior attempts to create blade platforms separate from the blade. U.S. Pat. Nos. 4,019,832 and 5,277,548 are two examples of prior efforts to utilize a bladed rotor with non-integral blade platforms. Present technological needs and manufacturing concerns for gas turbine engines requires continued development in the field of bladed rotors utilizing separable blade platforms. The present invention provides a novel and non-obvious way of coupling the separable blade platforms to the gas turbine engine disk/wheel.

SUMMARY

One form of the present invention contemplates a gas turbine engine blade platform comprising: a main body having a leading edge and a trailing edge with an outer surface extending substantially therebetween, the outer surface further extending between a first blade engagement side and a second blade engagement side; and, at least one pair of platform retention members extending from the main body, one of the pair of platform retention members is located at the first blade engagement side and the other of the pair of platform retention members spaced from the one of the pair of platform retention members and located at the second blade engagement side, wherein the pair of platform retention members are adapted to be located on opposites sides of a disk lug to restrain radial movement of the main body.

Another form of the present invention contemplates an apparatus comprising: a gas turbine engine wheel having a plurality of circumferentially spaced blade attachment lugs, each of the blade attachment lugs having a first side, a second side and a top surface; a plurality of blade platforms, each of the blade platforms including an outer surface, each blade platform overlies one of said top surfaces and is coupled to one of the blade attachment lugs by at least a pair of platform coupling members, one of the pair of platform coupling members located adjacent the first side of the blade attachment lug and the other of the platform coupling members located adjacent the second side of the blade attachment lug, wherein the platform coupling members preventing radial movement of the blade platform; and a plurality of blades spaced circumferentially around the wheel, each of the blades is located between a pair of the blade attachment lugs and coupled to the wheel thereby, at least a portion of the outer surface of each of the blade platforms extending between and abutting a pair of the blades, wherein the plurality of outer surfaces adjoining one another to form a barrier.

Yet another form of the present invention contemplates an apparatus comprising: a gas turbine engine disk having a plurality of circumferentially spaced blade attachment lugs, each of the blade attachment lugs having a first side, a second side and a top surface; a plurality of cast blade platforms, each of the blade platforms including an outer flowpath surface, each blade platform overlies one of said top surfaces and is coupled to one of the blade attachment lugs by means for coupling the blade platform with the blade attachment lugs; and a plurality of blades spaced circumferentially around the disk, each of the blades is connected to the disk by a pair of the blade attachment lugs, at least a portion of the outer surface of each of the blade platforms adjoining one another to form a barrier to the hot thermal gas flow within a gas turbine engine.

One object of the present invention is to provide a unique blade platform.

Related objects and advantages of the present invention will be apparent from the following description.

DESCRIPTION OF THE PREFERRED EMBODIMENTS

Figure 1:
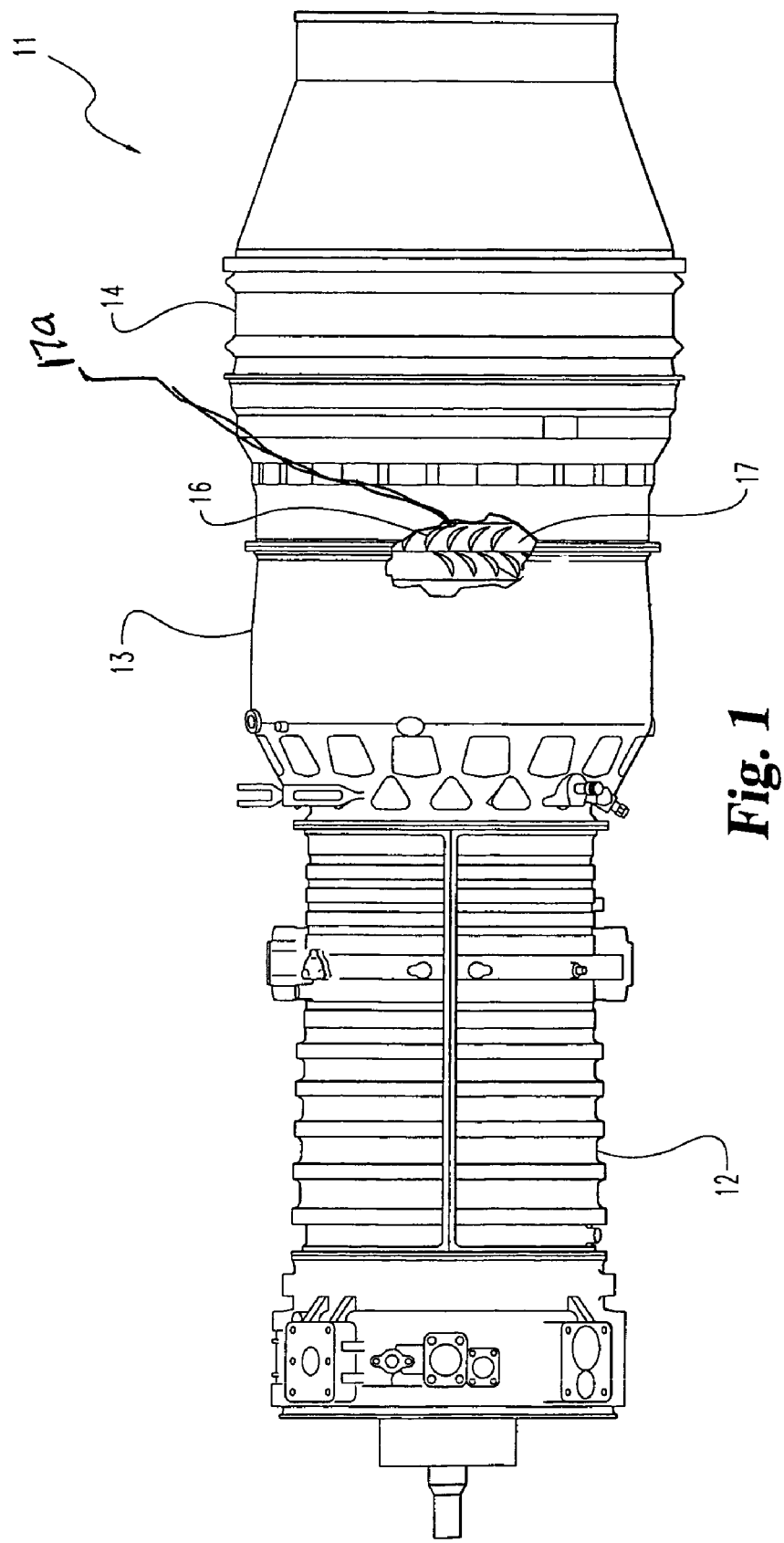
FIG. 1 is a partially fragmented site elevational view of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention was developed for application in the field of turbo machinery, including, but not limited to, gas turbine engines. While the present invention is broadly applicable to gas turbine engines, it has specific, but is not limited to, application in gas turbine engines utilized in aircraft. It is understood that the term aircraft is generic and includes, but is not limited to, helicopters, tactical fighters, trainers, missiles, unmanned vehicles, planes, space reentry vehicles and other types of related apparatus. Historically, there has been widespread application of industrial gas turbine engines, such as pumping stages for gas and oil transmission lines, electricity generation, and naval propulsion.

With reference to FIG. 1, there is illustrated one non-limiting embodiment of a gas turbine engine 11. The gas turbine engine 11 illustrated in FIG. 1 is illustrative and there is no intention to limit the types and configurations of gas turbine engines contemplated herein. Gas turbine engine 11 includes a compressor 12, combuster 13, and a turbine 14. It is important to realize that there are multitudes of ways in which the components of the gas turbine engine can be linked together. Additional compressors can be added with an inter-cooler connecting between the compressors, and reheat combustion chambers can be added between the turbines. Further, gas turbine engines are equally suited to be used for industrial applications. Historically, there has been widespread application of industrial gas turbine engines, such as pumping stages for gas and oil transmission lines, electricity generation, and naval propulsion.

The gas turbine engine 11 includes at least one rotatable bladed rotor 17 for interacting with a working fluid. The bladed rotor 17 includes a disk/wheel 17a that carries a plurality of blades 16. While the rotor 17 selected for description herein is located within the turbine section 14 of the gas turbine engine the present invention is also contemplated for utilization in the compressor section, a fan section, or other locations within the gas turbine engine or other machinery requiring a bladed rotor. General background information regarding gas turbine engines and bladed rotors will not be set forth herein, as that type of information is believed generally known to one of ordinary skill in the art.

Figure 2:
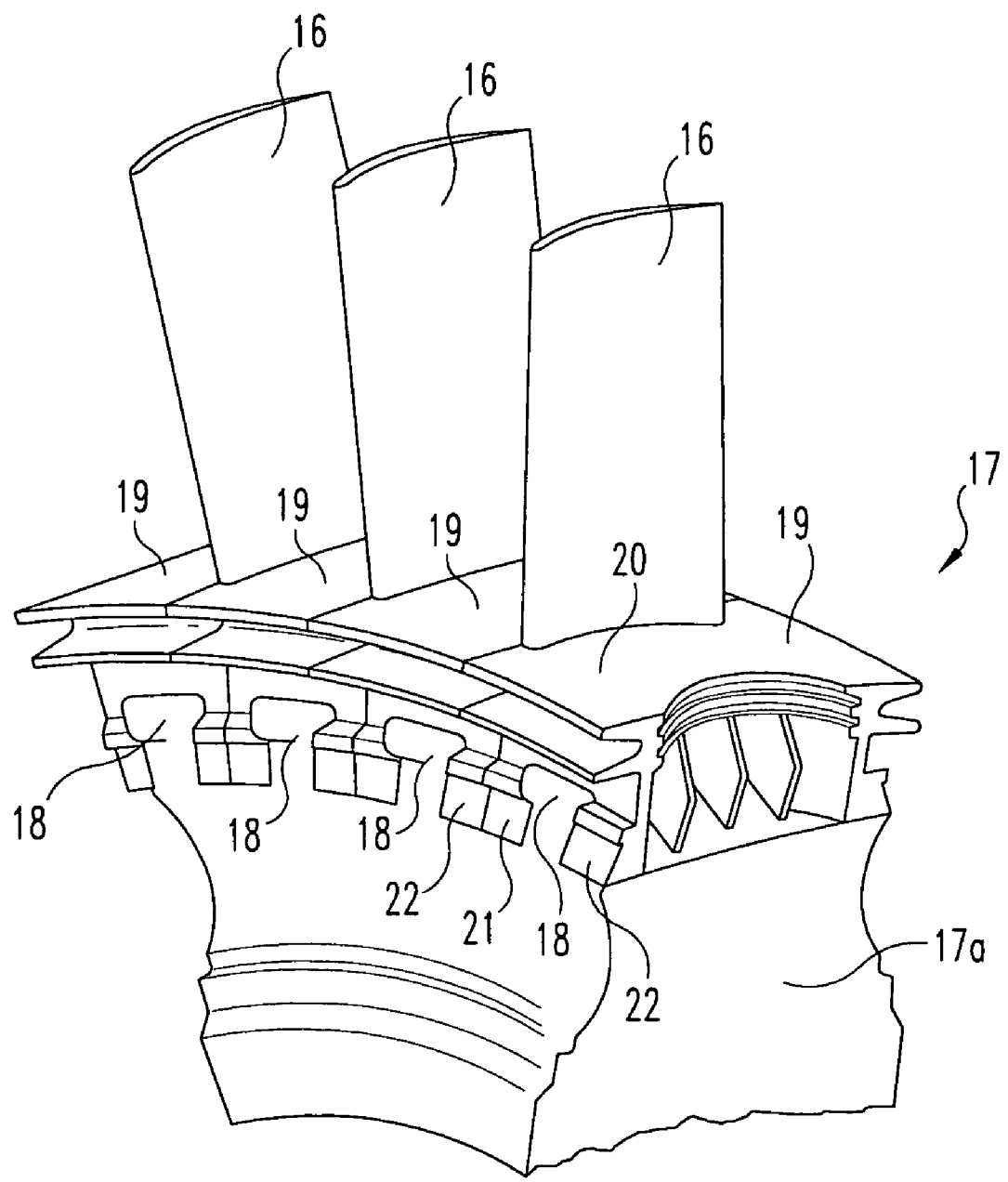
FIG. 2 is an enlarged partial perspective view of a bladed rotor disk of FIG. 1 comprising one form of the present invention.
Figure 3:
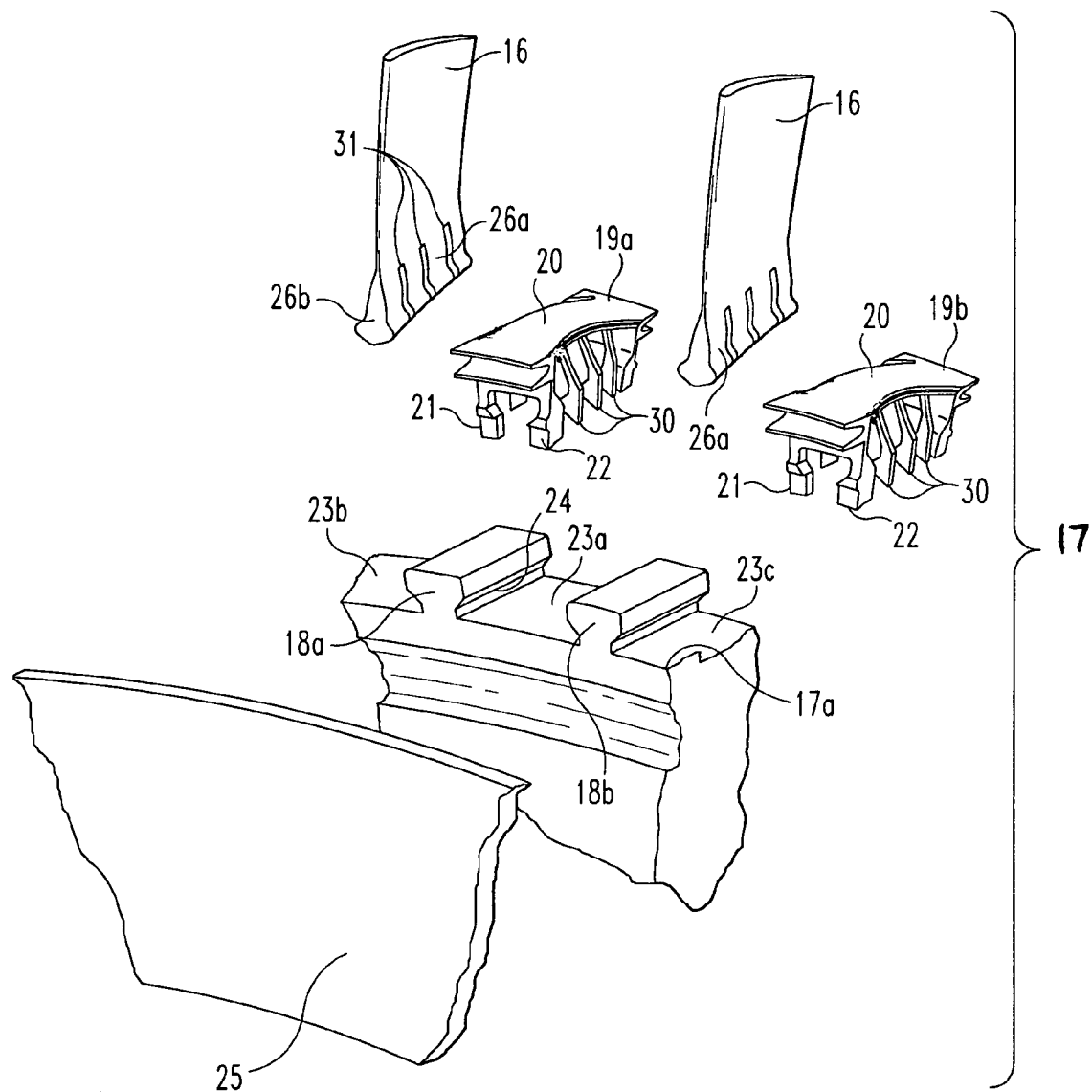
FIG. 3 is an illustrative exploded view of the bladed rotor disk of FIG. 2.

With reference to FIGS. 2 and 3, there is illustrated a partial view of the rotatable bladed rotor 17 including the disk/wheel 17a carrying the plurality of blades 16 and the plurality of separable blade platforms 19. The plurality of blades 16 is spaced circumferentially around the 360 degrees of the disk/wheel 17a. A plurality of spaced lugs 18 form a portion of the disk/wheel 17a and are spaced circumferentially around the 360 degrees of the disk/wheel 17a. The plurality of lugs 18 may be integrally formed with the disk/wheel 17a and/or formed separately and connected to the disk/wheel 17a and/or machined into the disk/wheel 17a. Each of the plurality of blades 16 includes a root portion 26 that is disposed within a slot 23 defined between a pair of adjacent lugs 18.

Each of the plurality of separable blade platforms 19 includes an outer surface 20 that defines a flowpath between the plurality of blades 16, and in a preferred form the outer surface 20 defines an aerodynamic flowpath. The separable blade platforms 19 each include lug retention members that are configured to interface with and engage the lugs 18 and attach the separable blade platforms 19 to the disk/wheel 17a. In one form of the present invention the lug retention members of the separable blade platform 19 include retention portions 21 and 22. The retention portions 21 and 22 of each separable blade platform 19 engage one of the plurality of lugs 18 on both sides of the lug 18. In each of the slots 23 that is disposed between a pair of adjacent spaced lugs 18, there is located a retention portion 21 of one separable platform 19, a retention portion 22 of another separable platform 19 and the root portion 26 of one of the blades 16.

A front cover plate 25 and rear a cover plate (not illustrated) when connected with the disk/wheel 17a prevent the axial movement of the retention portions 21, 22 and the root portion 26 disposed within each of the slots 23. The geometry and configuration for the cover plates is not intended to be limiting herein and other known means for limiting the axial movement of the components within the slot are contemplated herein.

With reference to FIG. 3, there is illustrated a portion of the bladed rotor 17 in an exploded view. The disk/wheel 17a includes the plurality of lugs 18, which are spaced apart and define the slots 23 between adjacent pairs of spaced lugs 18. In one embodiment of the present invention the slots 23 extend the axial width at the edge of the disk/wheel 17a. Each of the plurality of lugs 18 include bearing surfaces having a geometric shape to engage and restrain the movement of the separable blade platforms 19 and blades 16 in the radial direction. The geometric shape of the lugs 18 define a substantial dovetail shape in one embodiment, however other shapes and geometry are contemplated herein and there is no intention to limit the lugs 18 to the shape shown in the figures unless specifically stated. The cover plates function to prevent any substantial axial movement of the components within the slots relative to the disk/wheel and are coupled to the disk/wheel 17a after the blades 16 and the separable blade platforms are disposed within the slots 23.

The rotor 17 of the present invention, when assembled has the retention portion 22 of separable blade platform 19a disposed within the slot 23a and engaging the bearing surface 24 of lug 18a. The retention portion 21 of separable platform 19a is disposed within slot 23b and engages the bearing surface 24 on the opposite side of the lug 18a. Therefore, the separable blade platform 19a is coupled to the disk/wheel 17a by the interaction between the retention portions 21 and 22 of the separable blade platform 19a and lug 18a. In a corresponding manner, the retention portion 21 of separable blade platform 19b is disposed within slot 23a and engages the bearing surface 24 of lug 18b. Retention portion 22 of separable blade platform 19b is disposed within slot 23c on the other side of the lug 18b. The interaction between the retention portions 21 and 22 of separable blade platform 19b and the bearing surfaces 24 of the lug 18b couples the separable blade platform 19b to the disk/wheel 17a. It should be understood that in one form each of the separable blade platforms 19 are located in a substantially identical manner. Each of the blades 16 include root portion 26 with retention surfaces 26a and 26b that when located within the slot 23 engages the respective bearing surfaces 24 of the pair of spaced adjacent lugs. When the rotor 17 is assembled each of the slots 23 between a pair of lugs 18 has disposed therein a retention portion 22 of one of the separable blade platforms 19, the root portion 26 of a blade and the retention portion 21 of another separable blade platform 19. The location of these features within the slot 23 and engagement with the adjacent spaced pair of lugs 18 functions to couple the blade 16 and separable blade platforms 19 to the disk/wheel 17a. Further, this system prevents radial movement of the blade 16 and separable blade platforms 19 relative to the disk/wheel 17a.

In one form of the present invention each of the separable blade platforms 19 include locating fingers 30 that correspond to the locating receivers 31 formed in the blades 16. During pre-assembly of the components the locating fingers 30 of the separable blade platforms 19 are disposed within the corresponding locating receivers 31 of the respective blade 16 to pre-locate the components at a pre-determined position. In an alternative embodiment, described below, the separable blade platforms and the blades do not include the locating features associated with the locating fingers 30 and the locating receivers 31.

Figure 4:
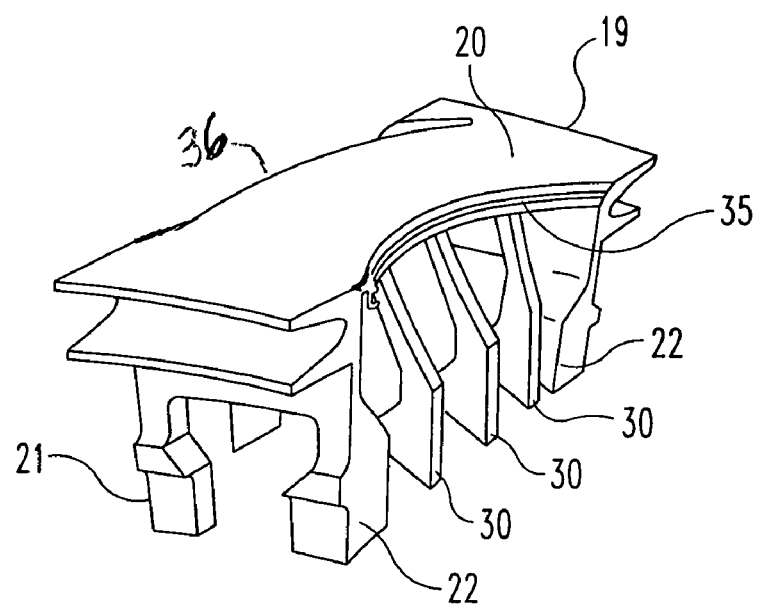
FIG. 4 is a perspective view of one embodiment of the separable blade platform of FIG. 2.

With reference to FIG. 4, there is illustrated an enlarged perspective view of one embodiment of the separable blade platform 19. Separable blade platform 19 includes the outer surface 20, which extends between the adjacent blades 16 and in a preferred embodiment has an aerodynamic surface. The separable platform 19 includes a pair of blade receiving portions 35 and 36 that are configured to correspond to at least a portion of the geometry of the blade 16. In a preferred form of the present invention the blade-receiving portions 35 and 36 are configured to correspond to the contour of the blade surface that will be disposed adjacent the respective portions 35 and 36. An embodiment of the present invention has a separable blade platform with one of the blade-receiving portions configured to match the suction side of a blade and the other blade-receiving portion configured to match the pressure side of the blade. In one form of the present invention the geometric relationship between the blade-receiving portions and the outer surface of the blade creates a substantially fluid tight interface. The present invention contemplates that the pair of blade-receiving portions formed on a separable blade platform 19 may have the same or different geometric configurations and may have different degrees of clearance with the corresponding curvature of the blade.

Figure 5:
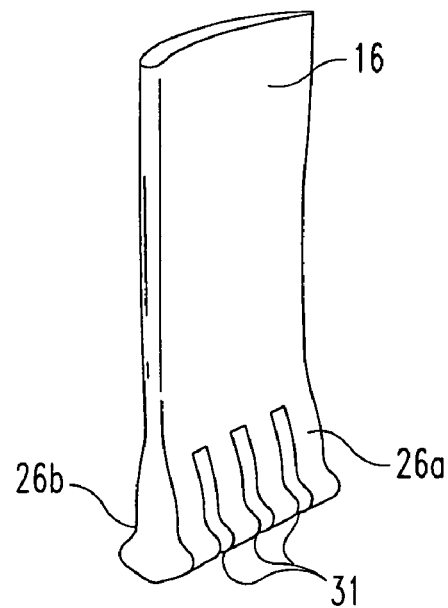
FIG. 5 is a perspective view of one embodiment the gas turbine engine blade of FIG. 2.

Separable blade platform 19 includes the retention portion 21 and retention portion 22. In one form of the present invention the retention portions 21 and 22 engage the lug 18 at fore and aft axial locations of the lug 18. The present invention contemplates many embodiments of where the retention portions may engage the lug: engage the lug at only one location of the lug; engage the lug at both ends and between the ends; engage the lug at one end and somewhere between the ends of the lug. The separable blade platform 19 of one form of the present invention includes locating fingers 30 that are spaced along the axial length of the separable blade platform. In one form of the present invention there are three locating fingers, however other numbers and spacing for the locating fingers 30 and locating receivers 31 are contemplated herein are contemplated herein. With reference to FIGS. 4 and 5, there is illustrated that the locating fingers 30 are formed at predetermined locations that correspond with the locating receivers 31 formed in the root portion 26 of one embodiment of the blade 16. The locating fingers 30 are received in a close fitting relationship with the locating receivers 31 and orient the blade 16 relative to the separable blade platform 19.

Figure 6:
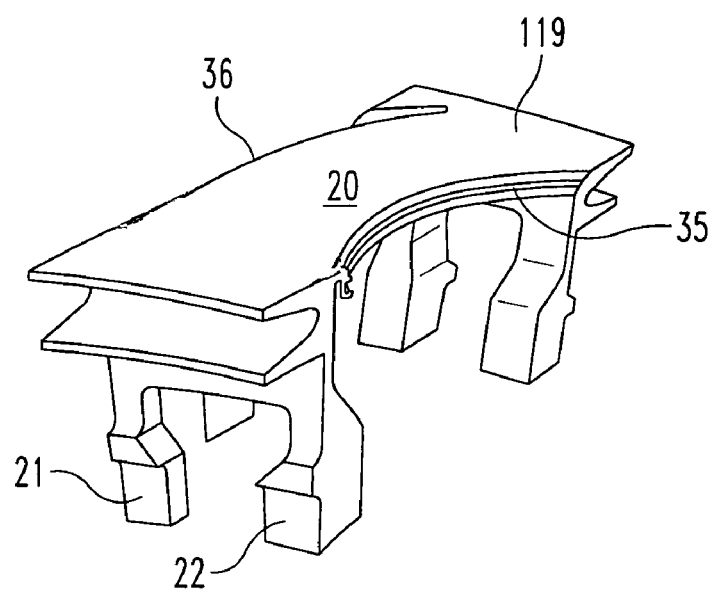
FIG. 6 is a perspective view of an alternative embodiment of a separable blade platform of the present invention.
Figure 7:
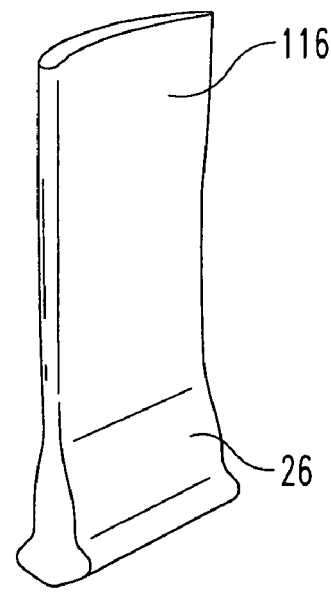
FIG. 7 is a perspective view of an alternative embodiment of a gas turbine engine blade of the present invention.

With reference to FIGS. 6 and 7, there is illustrated a separable blade platform 119 and blade 116 that are substantially similar to separable blade platforms 19 and blades 16 previously described. The separable blade platforms 119 and blades 116 are identical to the previously described blades 16 and separable blade platform 19 with the exception that they do not include the locating fingers 30 and locating receivers 31. The prior feature numbers utilized for blades 16 and separable blade platform 19 will be utilized to refer to identical features on these components 119 and 116.

It should be understood that the bladed rotor 17 of the present invention allows for significant flexibility in the selection of materials for the components. The separation of the platform from the blade allows for the utilization of different materials and different crystal structures for the components. The blade platforms may be made by many techniques, including but not limited to casting, fabrication from multiple pieces, forging, and/or machined from a piece of stock. In one form the blade platform is a metallic casting; however, platforms made from other materials, including but not limited to metallic alloys, ceramics, ceramic matrix composites, NbSi, are contemplated herein. The casting may be a single crystal casting, a directionally solidified casting or an equiaxed casting. Materials contemplated for the metallic platform include, but are not limited to CMSX-4. In one form of the present invention the separable blade platform is made out of a different material than the blade. However, in another embodiment of the present invention the separable blade platform and the blade are formed of the same material.

The bladed rotor 17 can be assembled from new components and/or utilized as a retrofit to introduce the separable blade platforms to existing disks/wheels. In one form of the present invention a blade 16 is positioned between a pair of separable blade platforms 19. The locating fingers 30 of the separable blade platform 19 are positioned within the respective locating receivers 31 of the blade 16 and the blade receiving portions 35 and 36 are aligned adjacent the corresponding surfaces of the blade. The plurality of blades and separable blade platforms are assembled in this fashion and the ring is than moved as a unit into engagement with the plurality of slots 23. The present inventions has application to the assembly of new bladed rotors and the rebuilding of existing bladed rotors.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A gas turbine engine blade platform comprising:
   a main body having a leading edge and a trailing edge with an outer surface extending substantially therebetween, said outer surface further extending between a first blade engagement side and a second blade engagement side; and
   at least one pair of platform retention members extending from said main body, one of said pair of platform retention members located at said first blade engagement side and the other of said pair of platform retention members spaced from said one of the pair of platform retention members and located at said second blade engagement side, wherein said pair of platform retention members are adapted to be located on opposites sides of a disk lug to restrain radial movement of said main body; and
   a plurality of blade prelocating members adapted to engage with a gas turbine engine blade.

2. The platform of claim 1, wherein said main body and said at least one pair of platform retention members are integrally cast of a metallic material.

3. The platform of claim 1, wherein each of said blade engagement sides include a blade abutment surface, wherein each of said blade abutment surfaces are configured to correspond with a blade profile.

4. The platform of claim 3, said first blade engagement side includes a first blade abutment surface and said second blade engagement side includes a second blade abutment surface, and wherein said blade abutment surfaces are dissimilar.

5. The platform of claim 3, wherein at least one of said blade abutment surfaces is adapted to wrap around a portion of a gas turbine engine blade.

6. The platform of claim 1, wherein said at least one pair of platform retention members includes a second pair of platform retention members adapted to be located on opposites sides of a disk lug to restrain radial movement of said main body.

7. The platform of claim 6, wherein one pair of said platform retention members being located proximate said leading edge and the second pair of said platform retention members being located proximate said trailing edge.

8. The platform of claim 1, wherein said outer surface having an aerodynamic shape, and further wherein said outer surface adapted to substantially cover the disk lug.

9. The platform of claim 1, wherein said at least one pair of platform retention members includes a second pair of platform retention members adapted to be located on opposites sides of a disk lug to restrain radial movement of said main body;
wherein said main body and said platform retention members are formed of a cast metallic material;
wherein each of said blade engagement sides include a blade abutment surface, wherein each of said blade abutment surfaces are configured to correspond with a blade profile; and
wherein said outer surface is adapted to substantially cover the disk lug.

10. The platform of claim 9, wherein the platform is a single crystal component formed of a high temperature material.

11. The platform of claim 1, wherein said main body and said at least one pair of platform retention members are defined by a unitary casting having a single crystal microstructure.

12. An apparatus comprising:
a gas turbine engine wheel having a plurality of circumferentially spaced blade attachment lugs, each of said blade attachment lugs having a first side, a second side and a top surface;
a plurality of blade platforms, each of said blade platforms including an outer surface, each blade platform overlies one of said top surfaces and is coupled to one of said blade attachment lugs by at least a pair of platform coupling members, one of said pair of platform coupling members located adjacent said first side of the blade attachment lug and the other of said platform coupling members located adjacent said second side of the blade attachment lug, wherein said platform coupling members preventing radial movement of said blade platform, wherein each of said plurality of blade platforms is of a metallic single crystal;
a plurality of blades spaced circumferentially around said wheel, each of said blades is located between a pair of said blade attachment lugs and coupled to said wheel, at least a portion of said outer surface of each of the blade platforms extending between and abutting a pair of said blades, wherein said plurality of outer surfaces adjoining one another to form a barrier;
wherein each of said plurality of blade platforms include a first blade contacting portion configured to mate with a portion of one of said pair of blades and a second blade contacting portion configured to mate with a portion of the other of said pair of blades; wherein said at least a pair of platform coupling members includes two pairs of platform coupling members, and wherein each of said pairs of platform coupling members substantially wrap around said first side and said second side and said top surface of the blade attachment lug and wherein each of said plurality of blade platforms includes a plurality of blade locating members, and wherein each of said plurality of blades includes a plurality of apertures for receiving said blade locating members.

13. The apparatus of claim 12, wherein said each of plurality of blade platforms is cast of a metallic material.

14. The apparatus of claim 12, wherein each of said blade platforms is a single piece casting.

15. An apparatus comprising:
a gas turbine engine wheel having a plurality of circumferentially spaced blade attachment lugs, each of said blade attachment lugs having a first side, a second side and a top surface;
a plurality of blade platforms, each of said blade platforms including an outer surface, each blade platform overlies one of said top surfaces and is coupled to one of said blade attachment lugs by at least a pair of platform coupling members, one of said pair of platform coupling members located adjacent said first side of the blade attachment lug and the other of said platform coupling members located adjacent said second side of the blade attachment lug, wherein said platform coupling members preventing radial movement of said blade platform;
a plurality of blades spaced circumferentially around said wheel, each of said blades is located between a pair of said blade attachment lugs and coupled to said wheel thereby, at least a portion of said outer surface of each of the blade platforms extending between and abutting a pair of said blades, wherein said plurality of outer surfaces adjoining one another to form a barrier; and
wherein each of said plurality of blade platforms includes a plurality of blade locating members, and wherein each of said plurality of blades includes a plurality of apertures for receiving said blade locating members.

* * * * *